US012004918B2

(12) United States Patent
Gordon

(10) Patent No.: US 12,004,918 B2
(45) Date of Patent: Jun. 11, 2024

(54) DENTAL RESTORATION SYSTEM

(71) Applicant: Lance Daniel Gordon, Miami, FL (US)

(72) Inventor: Lance Daniel Gordon, Miami, FL (US)

(*) Notice: Subject to any disclaimer, the term of this patent is extended or adjusted under 35 U.S.C. 154(b) by 148 days.

(21) Appl. No.: 17/174,246

(22) Filed: Feb. 11, 2021

(65) Prior Publication Data

US 2021/0298873 A1  Sep. 30, 2021

Related U.S. Application Data

(60) Provisional application No. 62/975,108, filed on Feb. 11, 2020.

(51) Int. Cl.
*A61C 5/88* (2017.01)
*A61C 5/85* (2017.01)

(52) U.S. Cl.
CPC . *A61C 5/88* (2017.02); *A61C 5/85* (2017.02)

(58) Field of Classification Search
CPC .... A61C 5/88; A61C 5/85; A61C 5/80; A61C 5/82
See application file for complete search history.

(56) References Cited

U.S. PATENT DOCUMENTS

| 5,607,302 A * | 3/1997 | Garrison | A61C 5/85 |
| | | | 433/155 |
| 9,173,720 B2 * | 11/2015 | McDonald | A61C 5/88 |
| 2019/0183609 A1 * | 6/2019 | Yonnadam | A61C 5/85 |

* cited by examiner

*Primary Examiner* — Jan L Merene
*Assistant Examiner* — Luis Ruiz Martin
(74) *Attorney, Agent, or Firm* — Boris Leschinsky

(57) ABSTRACT

A dental matrix system enabling back-to-back tooth cavity fillings to be less tedious and more efficient. A wedge attached to a matrix band that is designed to be inserted between two teeth and then expanded into position on opposing sides of a tooth so a ring can be placed. The device is inserted perpendicular to the biting/occlusal surface of the tooth or teeth identified for repair. The folded/bonded band is dropped down between the teeth. The matrix consisting of the matrix band and the end tail section of the wedge is pushed between the teeth. The bond between the two halves of matrix band is broken. The matrix band is folded into an open position. A ring is then placed over the device with the tips of the ring aligned inside the open geometry of the folded matrix band or outside of the matrix band after being folded in.

10 Claims, 15 Drawing Sheets

DENTAL RESTORATION SYSTEM

FEDERALLY SPONSORED RESEARCH

Not Applicable

SEQUENCE LISTING OR PROGRAM

Not Applicable

TECHNICAL FIELD OF THE INVENTION

The present invention generally relates to devices used in the practice of a dental practitioner. More particularly, the present invention is related to a dental restorative or matrix system for use during the procedure of filling a tooth after removal of tooth decay.

BACKGROUND OF THE INVENTION

Tooth decay variously known as cavity and dental caries is the result of acid erosion of the tooth creating deep holes in the tooth, which if not treated through a filling will progressively get larger, affecting the deeper layers of the tooth and its nerves, causing debilitating pain, infection, and eventual loss of the tooth.

Treatment of dental caries involves removing the decay in the tooth and filling that space in the tooth with restorative materials such as composite, amalgam, gold, and other such materials to restore the shape and function of the tooth.

The procedure for filling a tooth after the decay is removed requires the use of a system known as, the matrix system. Generally, a matrix system comprises a plurality of parts that are temporarily placed around the tooth to be treated for filling, with these parts of the system removed after the procedure of filling is completed.

The primary functions of the matrix system are to isolate the tooth being filled from the encroachment of saliva and also to provide a tight seal and an outer contour around the tooth cavity to prevent the filling material from leaking into the surrounding space including the gum tissue, an outcome to be avoided, as any filling material that extrudes past the cavity would create future damage to adjacent teeth and the gum. The thin formable matrix bands of the matrix system form a retaining wall recreating the natural contours of the tooth and providing a barrier to prevent the filling material from leaking during the procedure.

A conventional sectional matrix system uses wedges, metal matrix bands, and a matrix ring to create a tight seal around the cavity of the tooth or teeth to prevent filling material from leaking into the surrounding gum tissue. The matrix ring places pressure on two adjacent teeth and pushes them apart with a spring-like force to create extra space between the teeth to build up the filling. After the filling material placed in the cavity hardens, the matrix bands, wedge, and the ring are removed, the space created between the teeth by the matrix ring closes, and the teeth come back to their original positions to form a tight contact between the teeth which prevents food entrapment which may lead to an onset of periodontal disease.

Currently, there are a variety of matrix systems marketed and used by dental practitioners to treat tooth decay. There are a number of different matrix types including sectional matrix systems, matrix bands retainers, and other configurations, but they are all designed to be placed between the tooth being restored and the adjacent tooth to help create the outside contour of the restorative material. These matrix systems involve multiple small parts which can be difficult to handle. Their placement in the mouth and around the teeth to be treated is a cumbersome task.

Therefore, what is needed is a matrix system that eliminates and reduces the number of small parts of the current matrix system but retains the basic pieces familiar to those in the art for ease of use, familiarity, and transition to a new matrix system.

SUMMARY OF THE INVENTION

The present invention is a dental matrix system that is an improvement over the currently available and popularly used matrix systems among dental practitioners. The matrix system of the present invention uses fewer small parts than the current matrix systems and enables the procedure of adjacent back-to-back tooth cavity fillings to be less tedious and more efficient.

Currently there are no matrix systems that can achieve the task of effectively doing multiple back-to-back fillings using a single part. Existing sectional matrix systems use three separate small parts to accomplish the same task.

A dental matrix system enables the procedure of back-to-back tooth cavity fillings to be less tedious and more efficient. The dental system of the invention includes a device and a ring. The device consists of a wedge attached to a matrix band that is designed to be inserted between two teeth and then expanded into position on opposing sides of the teeth so a ring can be placed. The device is first inserted perpendicular to the biting/occlusal surface of the teeth identified for repair and then from the side (buccal or lingual) surface. The folded/bonded band is dropped down between the teeth. The matrix consisting of the matrix band and the end tail section of the wedge is pushed between the teeth. Once the wedge and band are placed in their final position between the teeth, the bond between the two halves of the matrix band is broken. The matrix band is pushed and folded into an open position. A conventional ring is then placed over the device with the tips of the ring aligned on one side inside the open geometry of the folded matrix band and on the other side inside the open geometry of the wedge. Another technique variation allows for the tips of the ring to be placed on the outside of the matrix band. In this orientation, the matrix band is folded in on itself and against the teeth.

It is an object of the invention to provide a dental matrix system with fewer parts for a dental practitioner to handle and place between and around the teeth in the mouth of a patient.

It is yet another object of the present invention to provide a dental matrix system that is capable of performing multiple back-to-back cavity fillings easily and efficiently.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
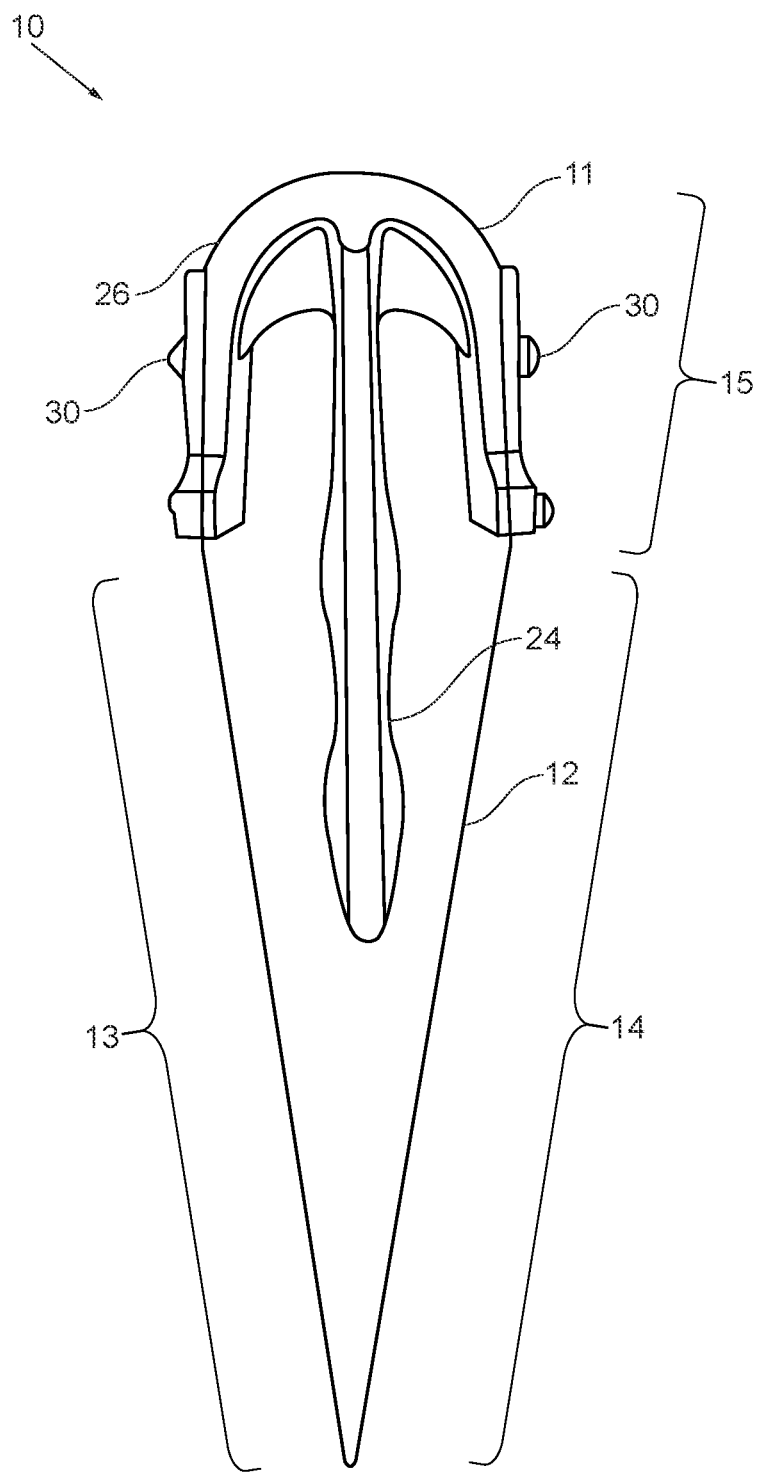
FIG. 1 illustrates one exemplary dental device of the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention is a dental matrix system that combines the function of the small parts of a sectional matrix system currently in use to create a novel matrix system with a smaller number of small parts, enabling a dental practitioner to place the parts of the system more easily in the mouth of a patient and perform the task of tooth filling in a more efficient manner. Current sectional matrix systems require the use of multiple parts when doing back-to-back fillings. These individual parts can be difficult to arrange so the practitioner will often fill one tooth at a time when faced with back-to-back fillings on a patient. If the practitioner decides to restore back-to-back fillings all at the same time, he/she must arrange individual matrix bands and wedges between the teeth. Arranging all of these separate parts is quite technique-sensitive. How well the matrix system is placed around the teeth will predict how well the filling comes out.

For example, in a clinical case requiring back-to-back fillings on four teeth, the current sectional matrix systems would require nine separate individual parts (six matrix bands and three wedges) that would need to be arranged around the teeth. The present invention would only require three total parts to accomplish the same task.

Another difficulty when using current sectional matrix systems is the placement of the matrix ring around the individually placed matrix bands and wedge. These individually placed bands can often bend in a way that obstructs the ring from being easily placed. The present invention allows for better adaptation of the matrix bands to the teeth shape which creates more space for placement of the matrix ring. The individual bands in current sectional matrix systems will also often slip out of place when pushing the wedge in between the teeth. The present invention addresses that issue by fixing the matrix bands to the wedge.

Now referring to FIG. 1, one exemplary embodiment of the present invention of a dental matrix device 10 is shown. A single plastic wedge 11 is combined with a matrix band 12 folded in half creating two functional sides 13 and 14. The matrix band 12 can be attached to the wedge 11 with either a snap-fit, heat staking, over-molding, or insert-molding.

In this embodiment, the matrix band 12 is attached to the wedge 11 at one end 15 on both sides thereof. Besides this attachment, the matrix band 12 moves freely independent of the wedge 11 inserted between the two sides 13 and 14 of the matrix band 12. This configuration of the matrix band 12 combined with a wedge 11 that is compressible is better adapted for insertion between the teeth and creates a more efficient seal in different sized inter-tooth spaces when compared to the prior art.

Figure 2:
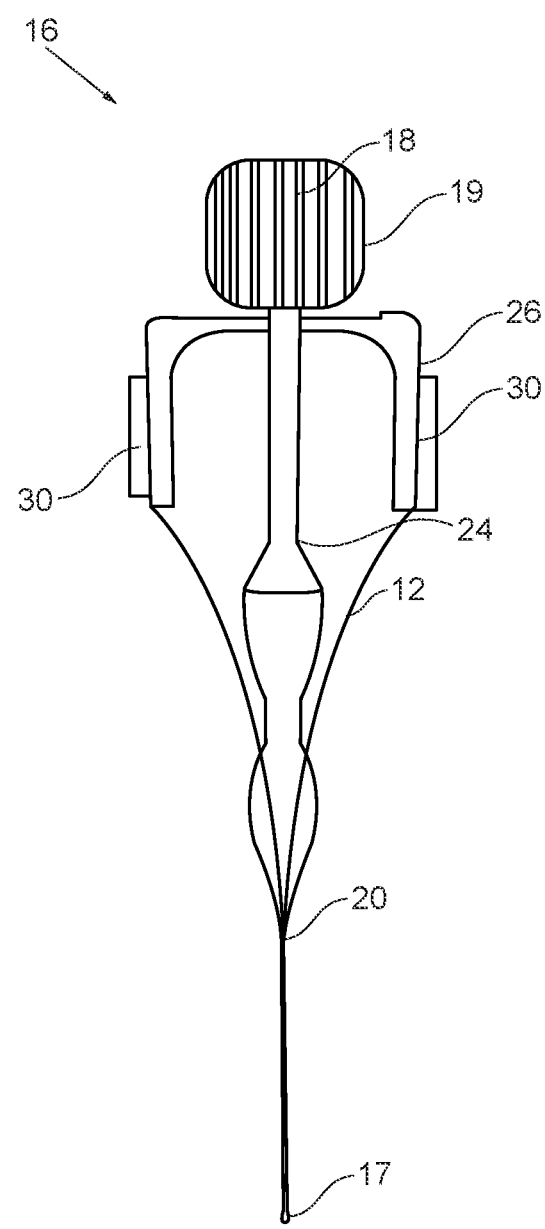
FIG. 2 illustrates an exemplary short wedge dental device of the present invention.

Now referring to FIG. 2, a short wedge embodiment 16 of the present invention is illustrated. In this embodiment, a radius 17 in the matrix band 12 decreases the chance of the matrix band 12 from breaking when folded during usage. A serrated surface 18 of a handle 19 attached to the wedge 11 coincides with serrated surfaces of a college plier that can be used in combination to assist in placement or manipulation of the wedge 11. In this embodiment, the matrix band 12 may be bonded to itself at position 20, for example by welding, adhesive, tape, or solder.

Figure 3:
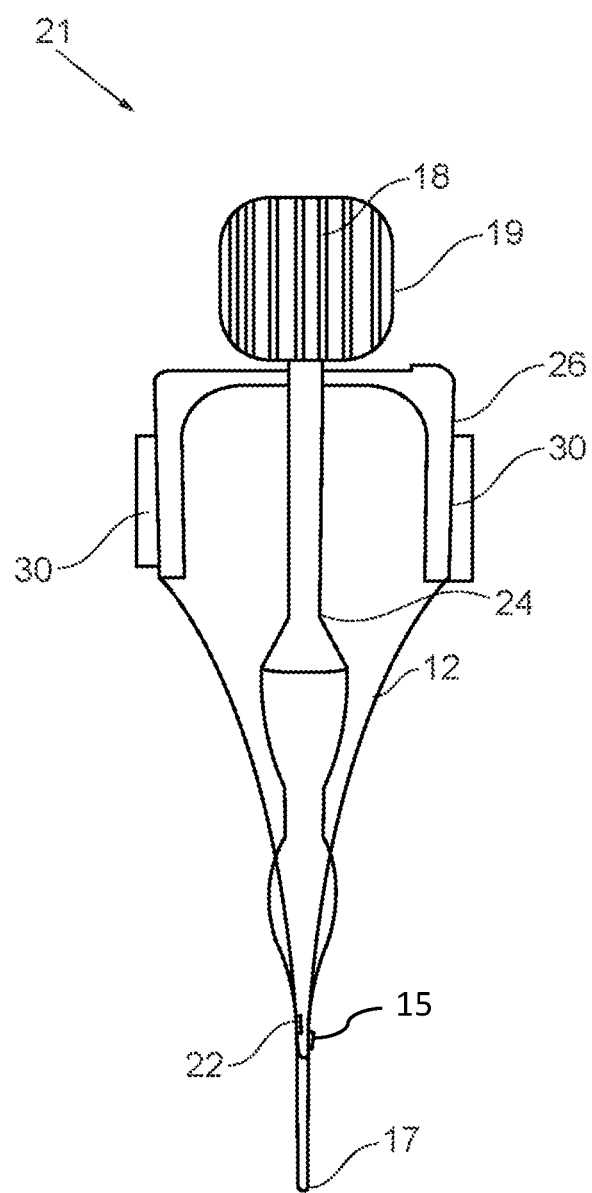
FIG. 3 illustrates an exemplary long wedge dental device of the present invention.

Now referring to FIG. 3, a long wedge embodiment 21 of the present invention is illustrated. In this embodiment, the matrix band 12 is not bonded to itself. It is attached to the wedge 11 at position 22. The matrix band 12 is attached on both ends 15 and 22 on both sides of the wedge 11 to assist in keeping everything in place.

Figure 11:
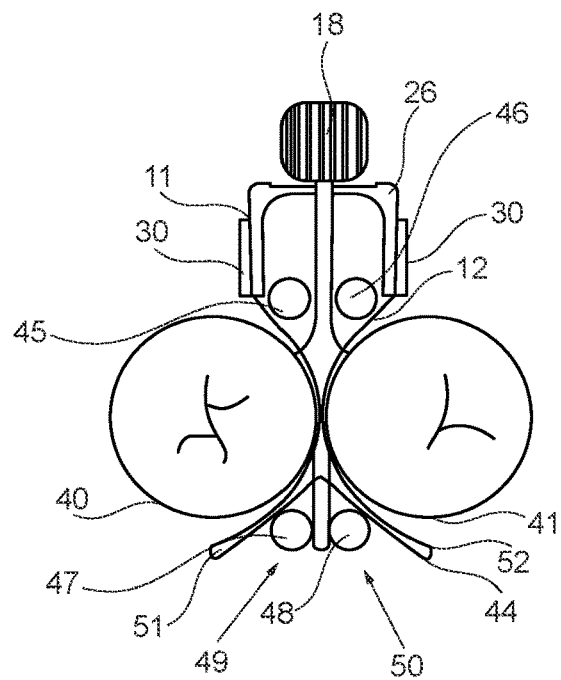
Figure 12:
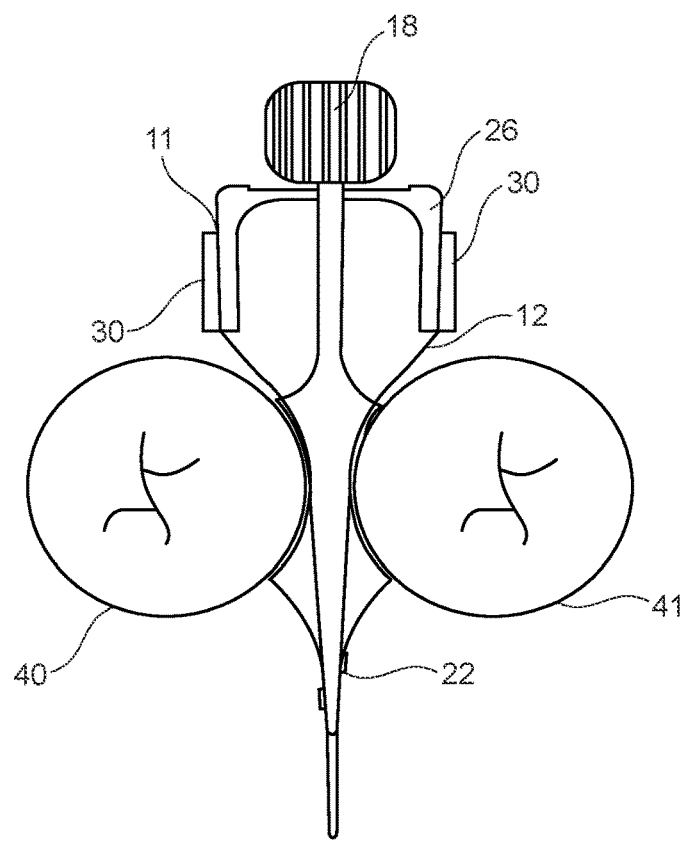
Figure 13:
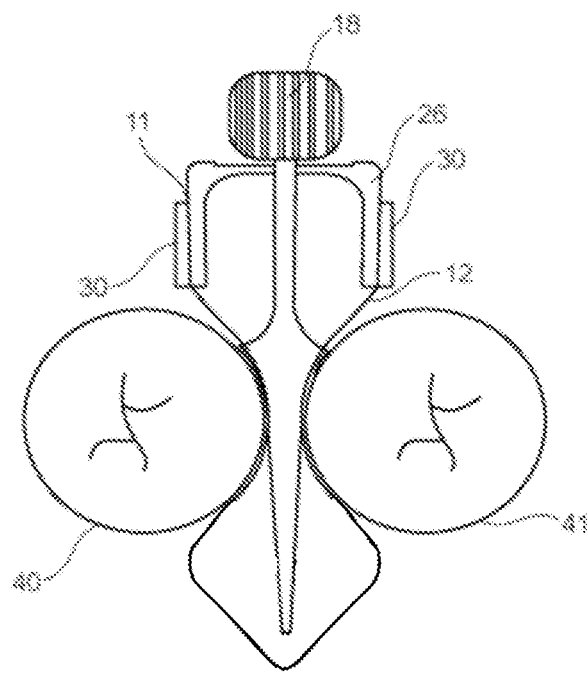
Figure 14:
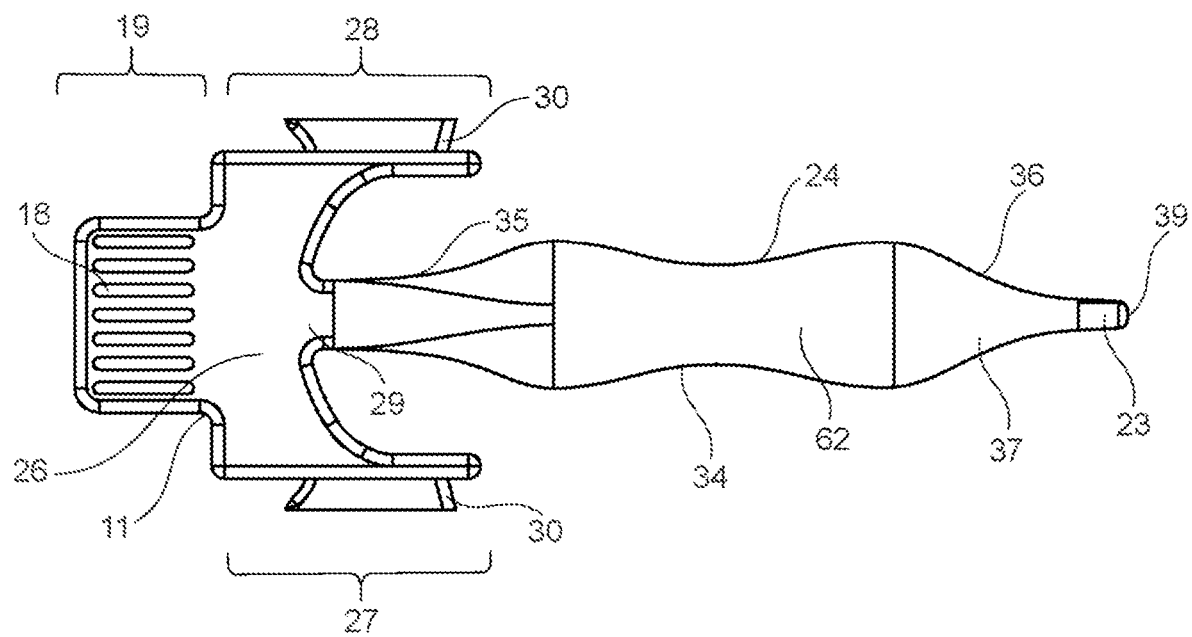
FIGS. 14-18 are planar views of the wedge device for use in a dental restorative system as taught by the present invention.
Figure 15:
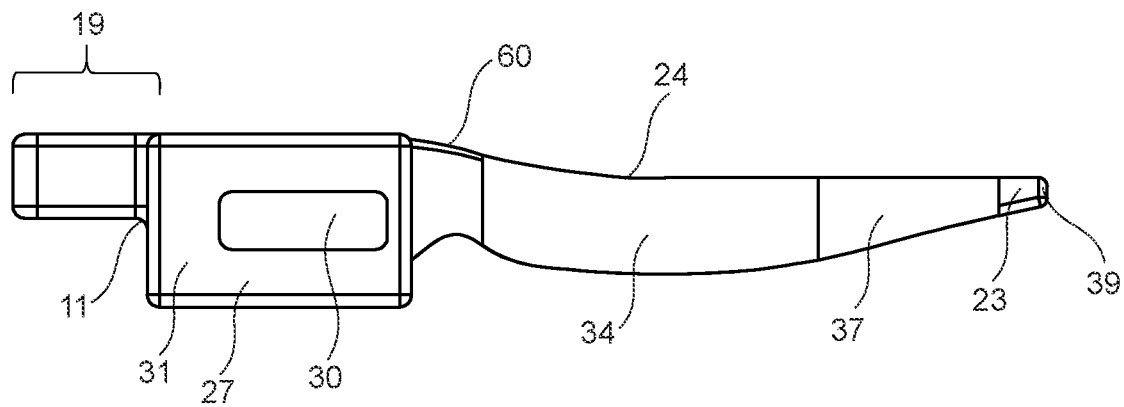
Figure 16:
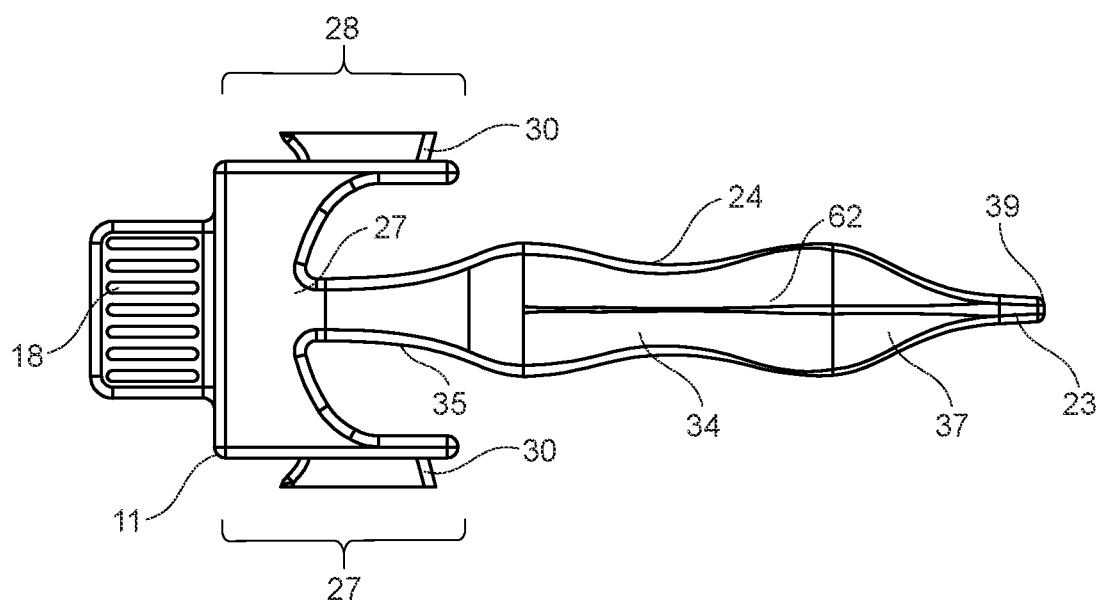
Figure 17:
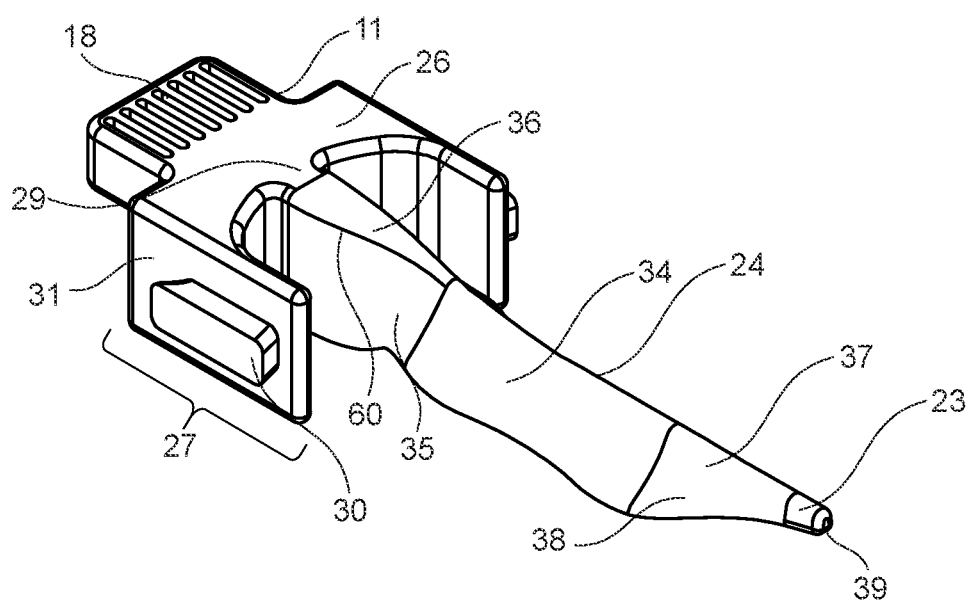
Figure 18:
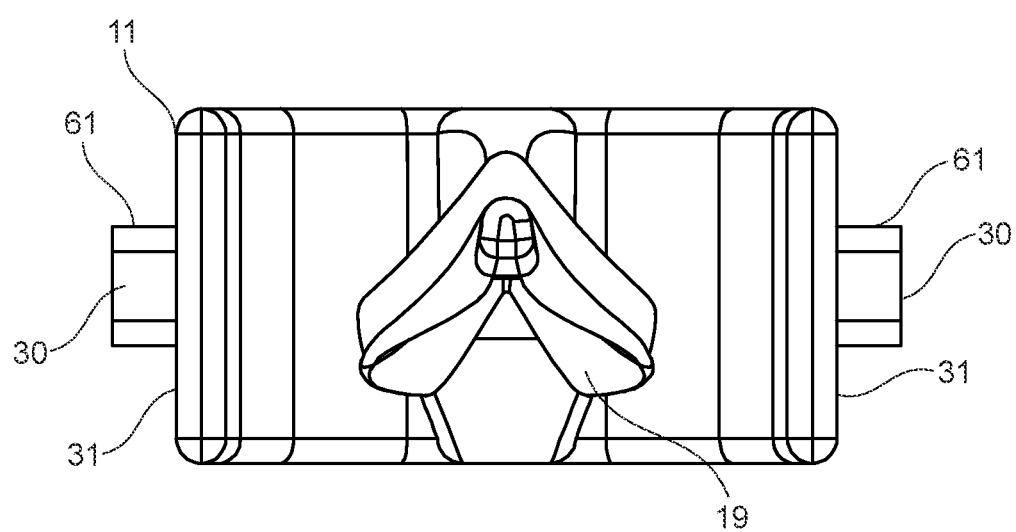
Figure 19:
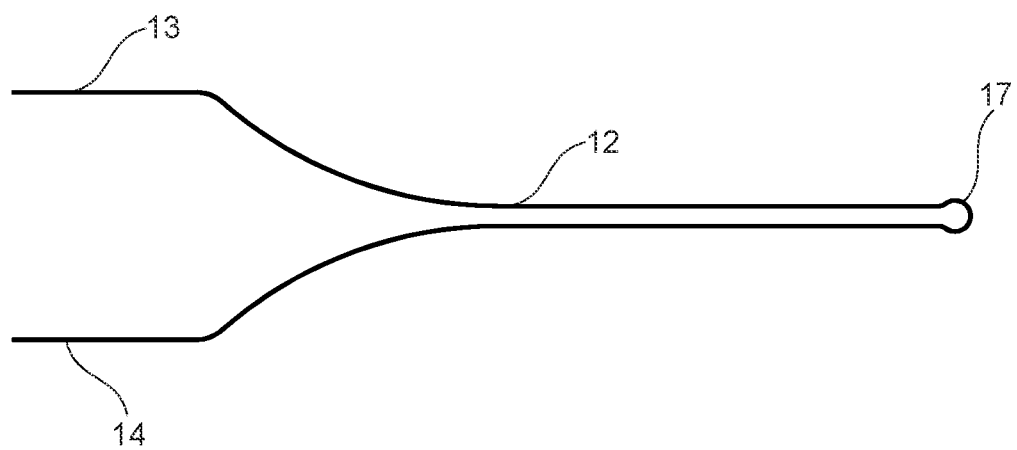
FIGS. 19-26 are planar views of the matrix band for use in a dental restorative system as taught by the present invention.
Figure 20:
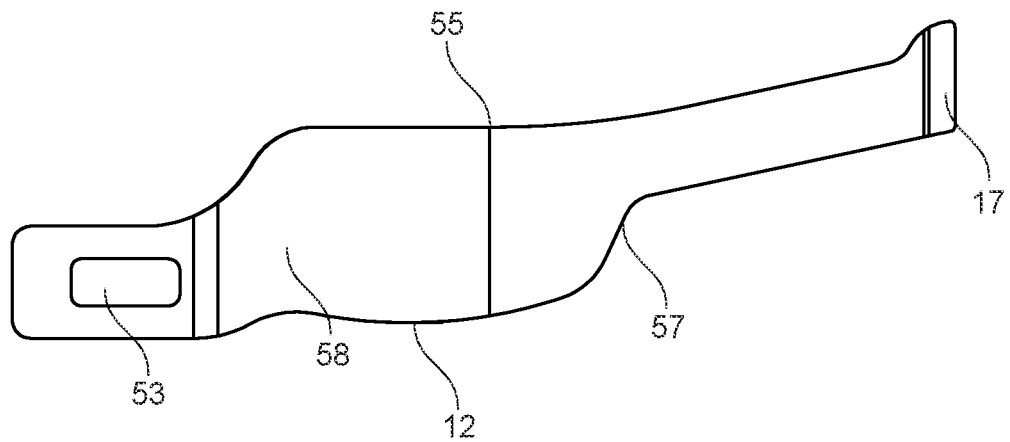
Figure 21:
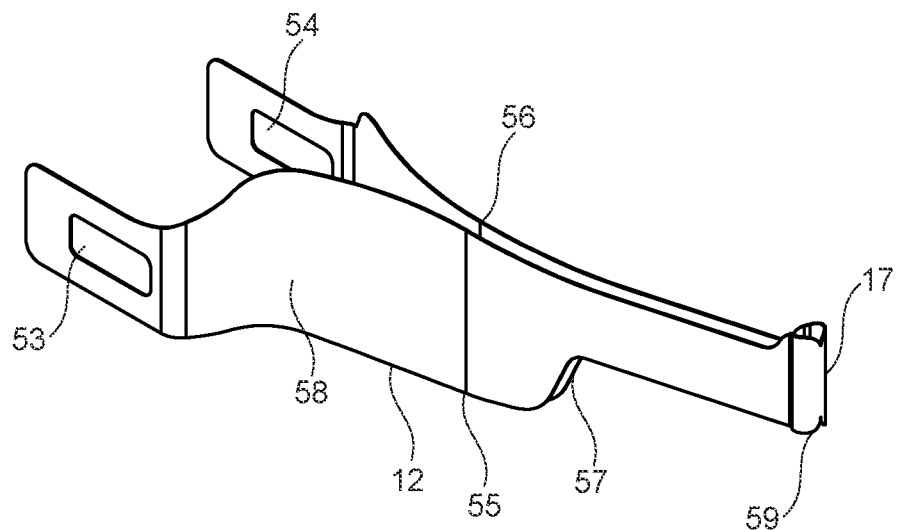
Figure 22:
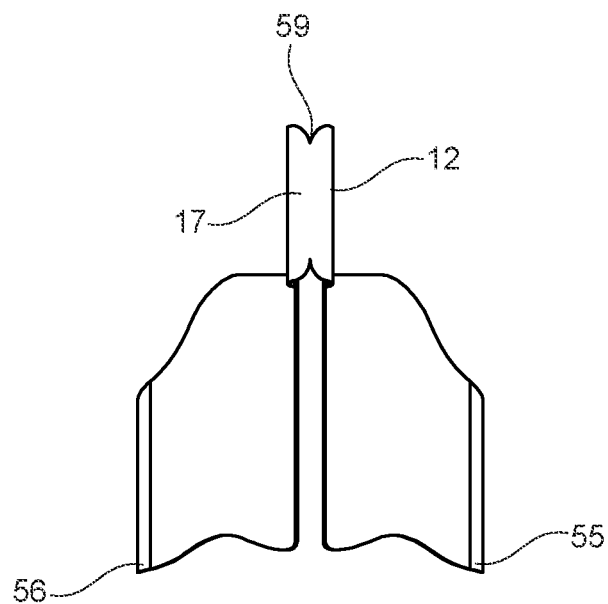
Figure 23:
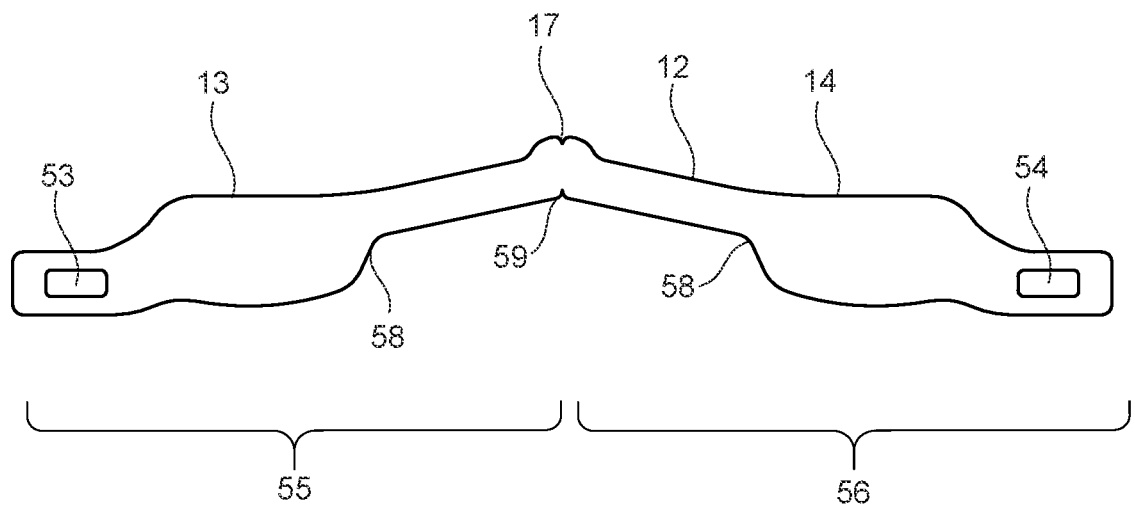
Figure 24:
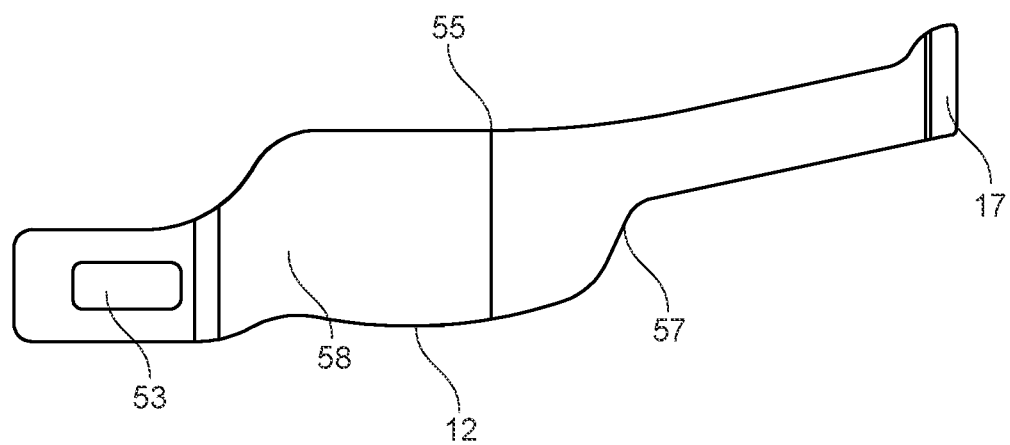
Figure 25:
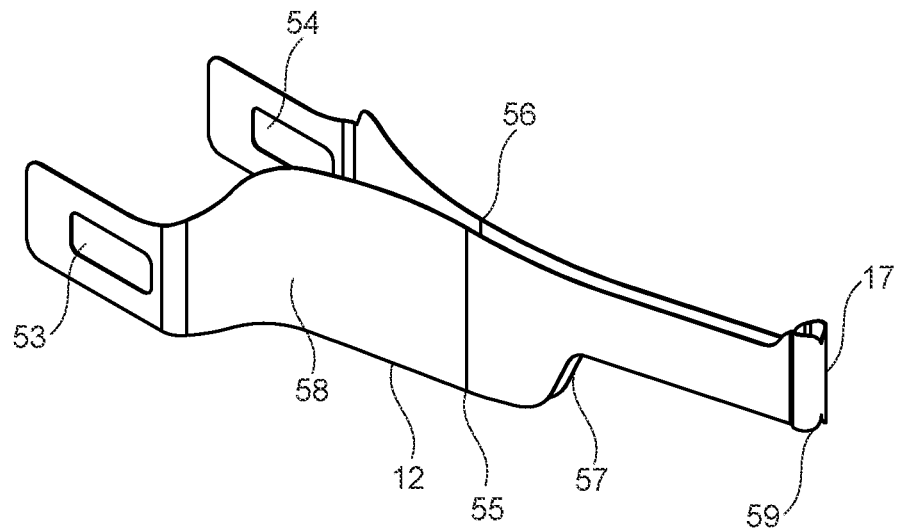

A radius 17 is placed at the furthest point of the matrix band 12 from the end tail of the wedge 24 to prevent breakage when pushing the matrix band 12 inward against itself and later transition it from a closed position to an open position as shown in FIGS. 11-13. The radius 17 at the end of the folded matrix band 12 creates strength for when the matrix band 12 is pushed inwards to create the arrowhead/diamond shape as shown in FIGS. 11 and 13. If the matrix band 12 were folded in half without this added radius 17 it would be more prone to breakage during use.

Figure 4A:
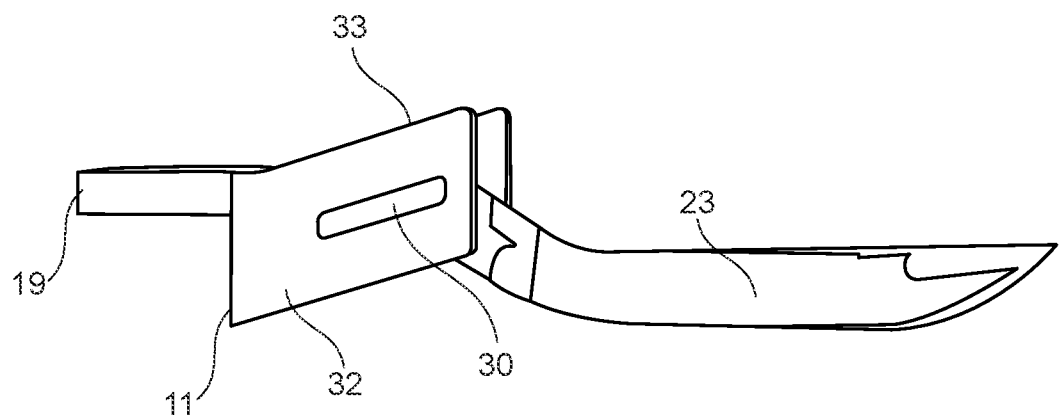
FIG. 4a illustrates a side view of the long wedge taught by the present invention.
Figure 4B:
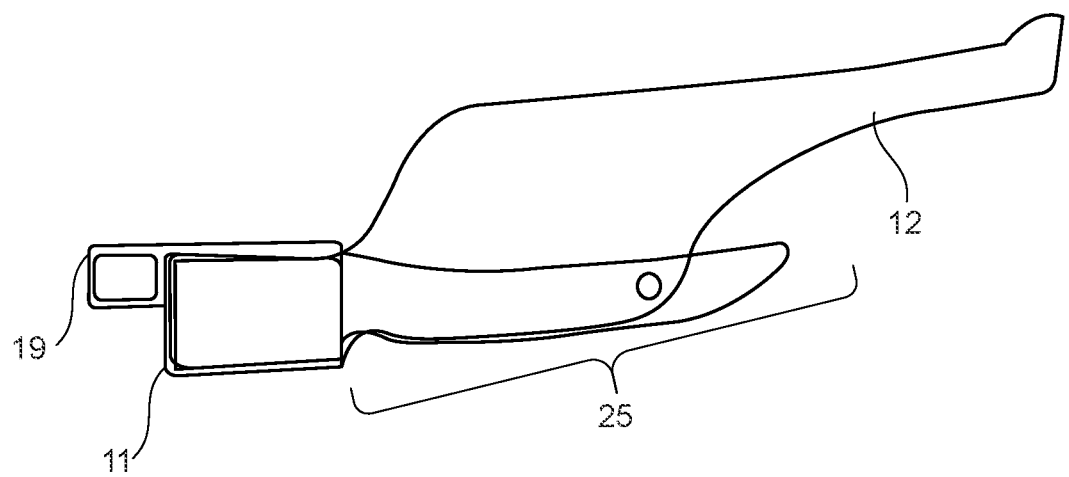
FIG. 4b illustrates a side view of one exemplary long wedge dental device of the present invention.
Figure 5:
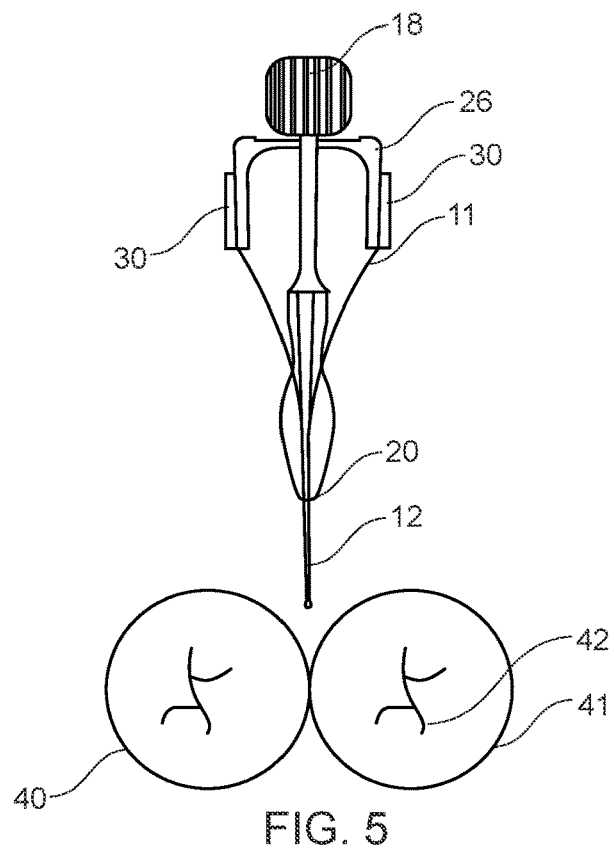
FIG. 5-13 illustrate the procedure of using the dental device of the present invention.
Figure 6:
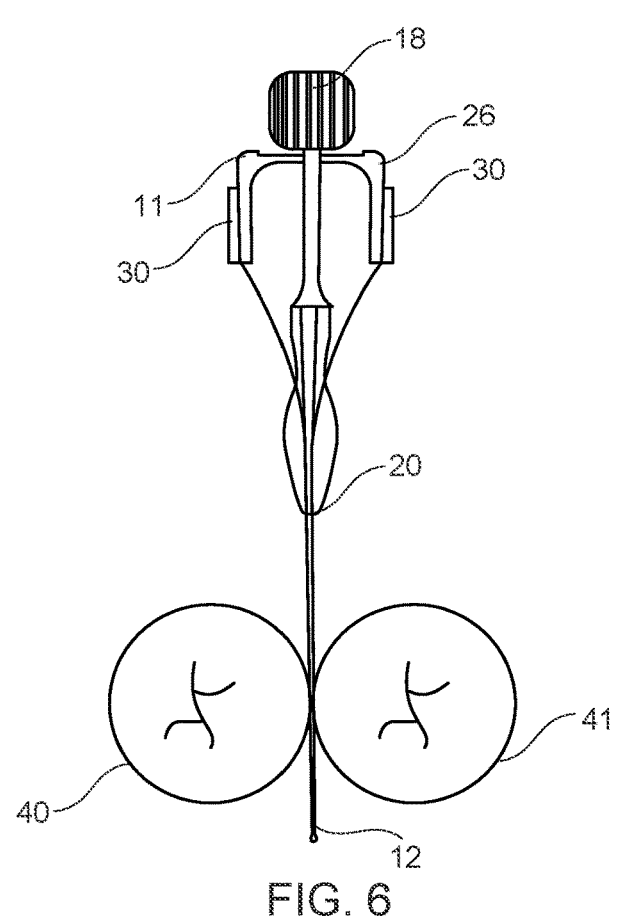
Figure 7:
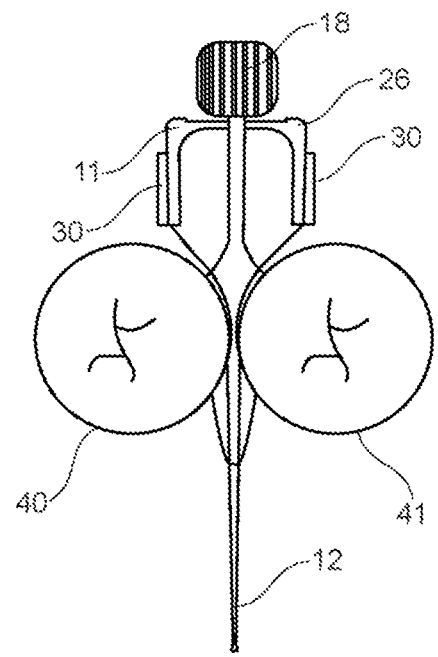

FIG. 4b is a side view of the long wedge 21 embodiment illustrating how an end tail section 24 of the wedge 11 with a longer length 25 allows space for attaching the matrix band 12 to the wedge 11 using a method such as heat staking the matrix band 12 to the end 22 of the end tail section 24 of the wedge 11. The long wedge embodiment 21 of the present invention is approximately 17 to 21 mm in length in comparison to the short wedge embodiment 16 of the present invention which is approximately 10 to 17 mm in length. The additional length of the long wedge embodiment 21 provides an extension area of the end or tail section 24 of the wedge 11 to create the needed surface area for attaching the matrix band 12 to the wedge 11 as required in the long wedge embodiment 21, compared to the short wedge embodiment 16 were the matrix band 12 is attached at position 20 to itself and not the wedge end tail section 24.

Now referring to FIG. 1 and FIG. 4a, the wedge 11 of the present invention comprises three sections: a handle section 19, a middle section 26, and an end tail section 24. The first section is a handle section 19 on a first end of the center or middle body section 26. The middle section 26 extends between the handle section 19 and an end tail body section 24. The extended end tail body section 24 is situated at an opposing end from the handle 19 and on an opposing side with respect to the handle 19 location with regard to the middle or center section 26.

The handle 19 section may have a serrated top or bottom outer surface 18 that may coincide with the serrated surfaces of a college pliers that can be used in combination to assist in placement or manipulation of the wedge 11 as shown in the figures.

Now referring to FIGS. 1-4 and FIG. 14, side and top views of the device of the present invention are shown. The handle section 19 transitions into the center or middle body section 26 which is generally U-shaped, with two arms 27 and 28 that extend outward and perpendicular to a center section 26, and parallel to the end tail body section 24, and configured for engaging with and attachment to a matrix band 12. The overall width of the center or middle U-shaped body section 26 allows for matrix ring tips to fit inside but is also narrow enough so that multiple devices can be placed next to each other in the mouth on adjacent teeth. The center or middle section 26 is not limited to being U-shaped as it can be any other equivalent or functional shape, as long as the center or middle section 26 does not interfere with the ring attachment or placement around or against one or more teeth. The Inventor, through rigorous testing and research, has found the illustrated embodiment to be the best shape for the invention after much trial and error.

The arms sections 27 and 28 are further comprised of buttons or protrusions 30 on their outer surfaces 31 configured to provide attachment of a matrix band 12 to the wedge 11. Buttons 30 provide a snap-fit of the matrix band 12 to the wedge 11; however, the attachment method could be achieved in many different ways including but not limited to heat staking, insert molding, over-molding, or gluing.

Additionally, the shape and angle of the arms 27 and 28 can vary, but through significant research as well as trial and error, the Inventor has determined that a slanted rectangular shape 32 with downward sloping slides 33 (as seen best in FIG. 4a) allows and provides adequate space for ring placement and enough surface area for the matrix band 12 to be attached. In this embodiment, the arms 27 and 28 are arranged in a slanted orientation, with a downward slope between 0 to 35 degrees from a horizontal plane/line running down the centerline of the wedge 11. A slope of approximately 17 degrees was found to be optimum through testing.

An end body or tail 24 extends from the center point 29 of the middle section 26. It runs in parallel to the arms 27 and 28 of the center of middle section 26. The end tail 24 is further comprised a central section 34 with a front end 36 and back end 37 featuring extended size and a tapered transition 35 which is more pronounced than existing wedges known in the prior art. This improvement allows more space for matrix ring placement and is purposely designed to be thin. At the very end 23 of the end or tail section 24, at its furthest point from the U-shaped middle 29 of the center section 26, the walls 36 and 37 of the end or tail section 24 come together to make one wall 39. This narrowing and reduction in surfaces and angles results in an easier insertion of the device between teeth and provides more space for rings tips.

Figure 8:
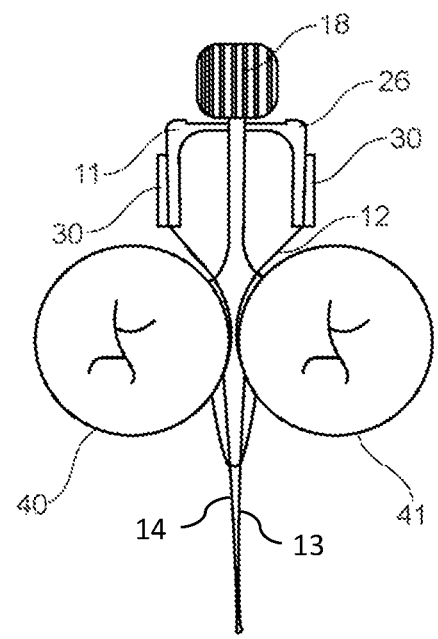
Figure 9:
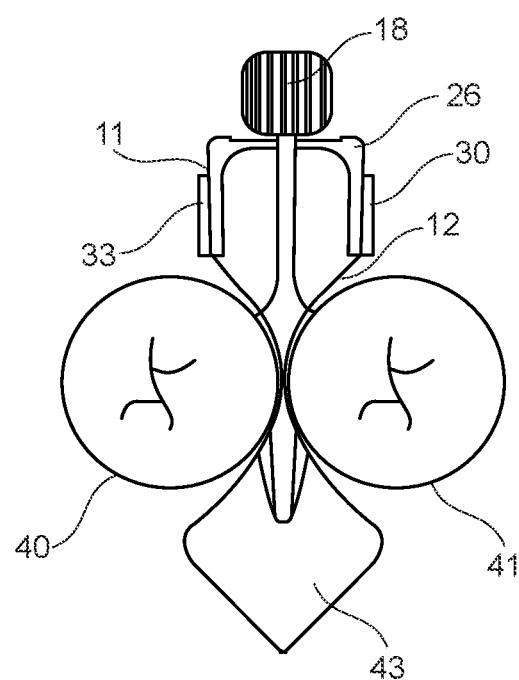
Figure 10:
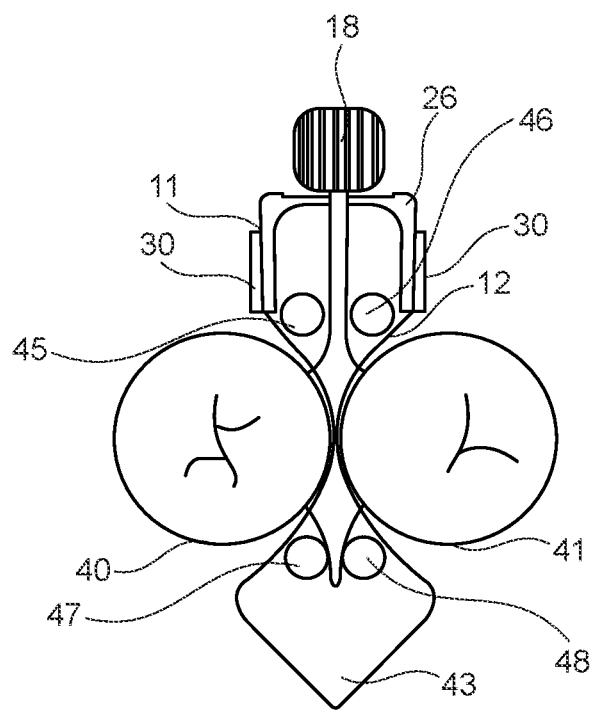

Now referring to FIGS. 5-11 matrix placement steps are illustrated for the short wedge embodiment 16. In a first step, teeth 40 and 41 are identified for repair and the device is prepared to be inserted perpendicular to the biting/occlusal surface 42 of the teeth 40 and 41. The matrix band 12 is lowered down between the teeth 40 and 41. The matrix consisting of the matrix band 12 and the end tail section 24 of the wedge 11 is pushed between the teeth 40 and 41. The bond or attachment at position 20 between the two halves of matrix band 13 and 14 is then broken using an instrument such as a perio probe—as shown in FIG. 8. The matrix band 12 is folded into an open diamond-shaped position 43 by being pushed by a finger or college pliers as shown in FIG. 9. A ring is then placed over the device 10 with the bifurcated tips of the ring aligned inside the open position 43 geometry of the matrix band 12 as shown in FIG. 10. Those familiar with the art will recognize that the ring tips of a standard sectional dental matrix system are bifurcated so that the ring can fit over current plastic wedges on the market.

In the present invention, the bifurcated ring tips 45-46 and 47-48 are aligned with the open spaces on opposing sides of the teeth 40 and 41 as shown in FIG. 10, where a ring is placed on both sides of the teeth 40 and 41 and is secured to the wedge 11 taught by the present invention. The bifurcated ring is positioned next to the middle section of the wedge 11 on one side of the teeth and around the end tail section 24 on the other or opposing side of teeth 40 and 41.

In an alternative method as shown in FIG. 11, the matrix band 12, after being pushed or pulled open, can be further pushed into a folded closed position 44, where the matrix band 12 is collapsed inward on itself until it is folded flat against two adjacent teeth 40 and 41. Bifurcated rings tips can then be placed on an outside aspect 49 and 50 of the folded matrix band portions 51 and 52 that are collapsed against adjacent teeth 40 and 41. Those familiar with the art will recognize that the bifurcated ring tips of a standard sectional dental matrix system can be aligned with the open spaces 45-48 on opposing sides of the teeth 40 and 41 as shown in FIG. 11.

When using the long wedge embodiment 21 of the present invention as illustrated in FIGS. 4a and 4b, the steps for matrix placement are slightly altered as illustrated in FIGS. 12-13. In a first step, adjacent teeth 40 and 41 are identified for repair and the device is prepared to be inserted perpendicular to the biting/occlusal surface of the tooth or teeth 40 and 41 identified for repair. The matrix band 12 is lowered down between the teeth 40 and 41 in an occlusal/biting direction. The matrix consisting of the matrix band 12 and the end tail section 24 of the wedge 11 is pushed between the teeth 40 and 41. As shown in FIG. 12, the staking bond 22 between the wedge 11 and band 12 is now broken, typically by using a perio probe. Finally, using a finger or college pliers, the matrix band 12 is configured to be folded into an open position 43 as shown in FIG. 13. A ring is then placed over the device with the tips of the ring aligned inside the open geometry of the folded matrix band 43 and within the U-shaped middle/center section 26 of the wedge 11 as shown in FIG. 10. Those familiar with the art will recognize that the ring tips of a standard dental matrix system can be aligned with the open spaces 45-48 on opposing sides of the teeth 40-41 as shown in FIG. 10.

As with the short wedge version 16, the matrix band 12, after being pulled into an open position 43, can be pushed into a folded closed position 44, where the matrix band 12 is collapsed inward on itself until it is folded flat against two adjacent teeth 40-41. Rings tips can then be placed on an outside aspect 49 and 50 of the folded matrix band portions 51-52 that are collapsed against adjacent teeth 40-41.

Those familiar with the art will recognize that the ring tips of a standard dental matrix system can be aligned with the spaces on opposing sides of the teeth 45-48 as shown in FIG.

11. Other prior art devices do not work as well with the matrix ring as the present invention, which was designed to work in combination with the popular matrix ring systems currently offered and in use so as to improve on the shortcomings of the current market devices. The prior art devices do not allow enough space for a matrix ring to be used. Matrix rings emit a force between the teeth which separates them and creates extra working space. This extra space gives a practitioner more room to build up the fillings between the teeth. Without this extra space for building up the fillings, the result is a very weak contact between the teeth after the fillings are completed.

For example: When one flosses the teeth after a filling procedure the snap which is heard and felt represents a good, closed, tight contact. If the floss goes through very easily just grazing the teeth and without a snap, that signifies a weak and open contact. A weak or open contact leads to food entrapment and possible periodontal disease.

Therefore, because the prior art does not allow enough space for a matrix ring, there will not be enough force to push the teeth apart from each other with the way the prior art devices are designed.

Thus, the use of these prior art devices is likely to leave an open or weak contact, making the prior art devices ineffective. Other shortcomings of the prior art devices are the resulting poor seals and margin adaptations during their use for repair. Additionally, the prior art and current devices found in the market use multi-piece bands or male and female wedges that must be aligned and connected between the teeth. This makes their usage much more complicated than necessary in comparison to the present invention, which has a single matrix band design and eliminates complex alignment and placing or connection requirements and tasks, simplifying the procedures and making them more accurate and less complex to complete.

Currently known prior art devices disclose a matrix band and a plastic wedge attached to one another along their full length. In this configuration, the matrix band is not free to move independently of the wedge. Additionally, the wedge in prior art devices is a non-compressible wedge. Both of these factors result in poor adaptation of the device to the variances in spaces between teeth. This results in a poor seal at the base of the filling which results in leakage of the filling material into the surrounding tissues.

Other prior art devices have previously attempted to combine the function of two matrix bands with a wedge. However, due to their geometry, it is not possible to insert and slide the device between the teeth 40-41 from the side approach (buccal/lingual) as is done with the present invention and illustrated in FIGS. 5-13.

With respect to the matrix band 12 of the present invention, the dental matrix device is inserted between the teeth 40-41 as shown in FIGS. 5-13 and the matrix band 12 is pushed open to form a diamond like shape 43 as shown in FIGS. 9-10, and 13.

In an alternative embodiment, another way of accomplishing insertion between the teeth 40-41 of the matrix band 12 would be to pre-bend the matrix band 12, made from metal, into a diamond-like open shape or position 43 before inserting between the teeth 40-41. The matrix band 12, made from metal, would then be flattened again before insertion between the teeth 40-41. Holding the plastic wedge 11, the device may be inserted into the narrow space between a pair of teeth 40-41, using the hand or separate college pliers.

The purpose of this "pre-bending" makes it easier to push the matrix band 12, made from metal, back open again into the diamond-like open shape position 43 shown in FIGS. 9-10, and 13 after the dental matrix device is placed between the teeth 40-41 as shown in FIG. 10 due to the property of metal memory and the residual effect of the previous bends.

The matrix band 12 may take on different variations of a diamond or arrowhead type open shape position 43 as shown in FIGS. 9-10, and 13. The matrix band 12 is manually pushed open and if the matrix band 12 is not pre-bent it will tend to form into a diamond or arrowhead open shape position 43. The arrowhead would be more ideal as it will better conform to the teeth 40-41, again as illustrated in FIGS. 9-10, and 13.

FIGS. 14-18 are planar side views of the wedge 11 of the short wedge embodiment 16 illustrating the shape and components parts shared between the two embodiments taught by the present invention.

FIGS. 19-26 illustrate the matrix band design of the present invention. A matrix band can be made from metal or plastic. In the present invention metal is the selected material of the matrix band, but other materials could be used. The matrix band designs only vary in height, which is standard in the field. The matrix band 12 is configured to be attached to the wedge 11. The matrix band 12 can be attached using heat staking, over molding, or insert molding. The wedge 11, as illustrated in FIGS. 14-18 is comprised of two buttons 30, one on each side, acting as attachments for the matrix band 12. In this embodiment, the matrix band 12 is configured to have two corresponding openings 53 and 54 sized to allow attachment to the buttons 30 of the wedge 11 for securing the matrix band 12 to the wedge 11.

Figure 26:
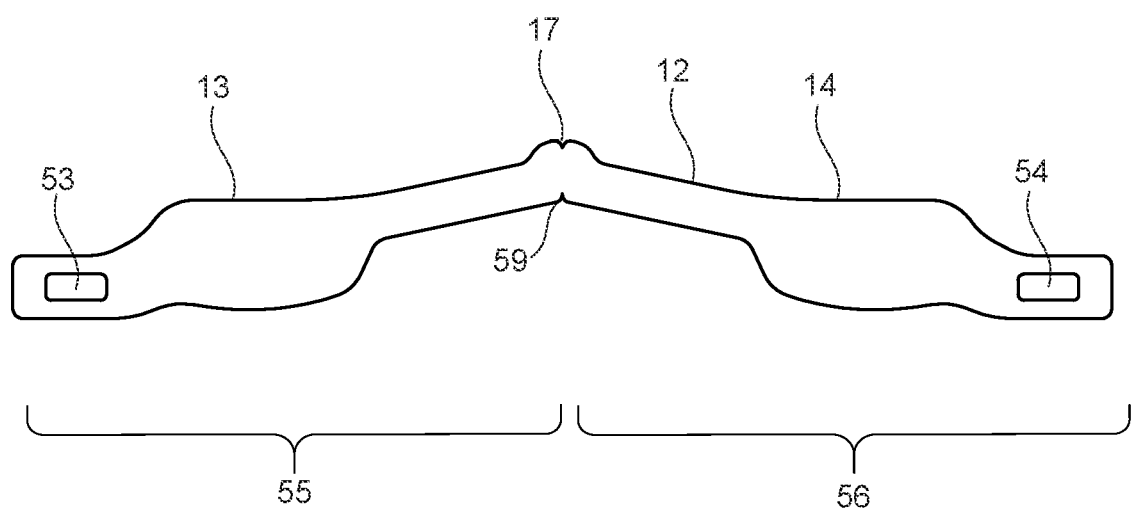

Referring specifically to FIG. 26, the matrix band 12 is symmetrical in shape having a left side 55 and right side 56. The matrix band 12 is angled upward in a center portion 57 and extends from the middle portion 58 toward a handle 59 to avoid cutting gum tissue when placed between the teeth 40-41. A center or middle matrix band section 57 connects the center portion 58 to the handle 59. In the present invention, the front end 60 of the wedge 11 also slopes down (see FIG. 17) so as to not obstruct the placement of various matrix rings known in the market. The rectangular shape 61 of the snap fit prevents any rotation of the matrix band 12, which helps maintain the position of the matrix band 12. However, the attachment method could be achieved in many different ways including but not limited to heat staking, insert molding, over molding, or gluing.

While the overall width of the center or middle section 26 allows for the matrix ring tip to fit inside, it is also narrow enough so that one can place multiple matrices next to each other in the mouth. Here, the overall width of the center or middle body section 26, which is illustrated as being U shaped, is preferably only wide enough to fit the ring tips inside to enable and provide enough room to place multiple dental matrix devices 10 side by side without obstruction of adjacent systems.

In yet another exemplary embodiment of the matrix device of the present invention, the matrix band is a dual matrix band. In this embodiment, the wedge is separate from the band. The dual band is bent and first placed between the teeth and then the wedge is placed between the two ends of the dual matrix band. In some embodiments, the dual matrix band may have variations in design as previously taught.

In yet another exemplary embodiment the matrix device is made of all the same material, has hollow shapes at opposing ends, and is pulled through the teeth instead of pushed through.

In one other exemplary embodiment the plastic matrix bands are combined with the wedge by being attached at the base of the wedge. These matrix bands act as flaps that will bend upwards before being placed between the teeth.

Thus, it is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for dental restoration, comprising the steps of providing a dental restoration system comprising:
   a wedge comprising three sections: a handle section, a middle section extending from the handle section, and an end tail section on the opposite side of the middle section,
   wherein the end tail section is configured and sized to be positioned between adjacent teeth; the middle section is defined by a center section with two arms extending therefrom in opposite directions, and
   a matrix band configured to have two ends thereof attached to the two corresponding arms of the wedge for securing the matrix band to the wedge;
   wherein the matrix band is bent in half or comprises two halves joined on one end thereof, the matrix band is connected to both sides of the dental wedge on the other end thereof, and
   wherein the matrix band is configured to expand the two halves thereof from a closed bonded position with both halves located next to the end tail section of the wedge and to each other to an open position with two halves spread away from the end tail section of the wedge and from each other upon breaking a bond between thereof,
   wherein the matrix band is sized to allow placing a matrix ring to secure the wedge and the matrix band adjacent to a tooth in need of repair,
inserting the matrix band while in the closed bonded position perpendicular to the biting/occlusal surface of the tooth or teeth identified for repair by first lowering the matrix band down between the teeth and pushing the matrix band and the end tail section of the wedge between the teeth;
breaking the bond between the two halves of the matrix band;
deforming the matrix band into the open position; and
placing a dental matrix ring over the matrix band with the tips of the ring aligned inside or outside the folded matrix band.

2. The method of claim 1, further comprising the step(s) of aligning the ring tips with open spaces on opposing sides of and across the teeth.

3. The method of claim 1, further comprising the step(s) of after the matrix band has been expanded into the open position, pushing the matrix band to protrude inward on itself until it is folded flat against two adjacent teeth;
   wherein the step of placing a dental matrix ring further comprises a step of placing the ring tips on an outside aspect portions of the folded matrix band that are positioned flush against adjacent teeth; and
   aligning the ring tips with open spaces on opposing sides of and across the teeth.

4. A method for dental restoration, comprising the steps of providing a dental restoration system comprising:
   a wedge comprising three sections: a handle section, a middle section extending from the handle section, and an end tail section on the opposite side of the middle section,
   wherein the end tail section is configured and sized to be positioned between adjacent teeth; the middle section is defined by a center section with two arms extending therefrom in opposite directions, and a matrix band configured to have two ends thereof attached to the two corresponding arms of the wedge for securing the matrix band to the wedge;
   wherein the matrix band is bent in half to form two halves joined on one end thereof and connected to both sides of the dental wedge on the other end thereof, and
   wherein the matrix band is configured to expand the two halves thereof from a closed bonded position next to the end tail section of the wedge to an open diamond-shaped position away from the end tail section of the wedge upon breaking a bond between the halves,
   wherein the matrix band is sized to allow placing a matrix ring inside a diamond-shaped internal space between the two halves of the matrix bond to secure the wedge and the matrix band adjacent to a tooth in need of repair,
inserting the matrix band perpendicular to the biting/occlusal surface of the tooth or teeth identified for repair by lowering the matrix band down between the teeth; and pushing the matrix band and the end tail section of the wedge between the teeth;
breaking the bond and deforming the matrix band into the open diamond-shaped position with the two halves deformed away from each other;
wherein the step of placing a dental matrix ring further comprises a step of placing a dental matrix ring over the matrix band inside the diamond-shaped space between the two halves of the matrix band with tips of the ring aligned inside or outside the matrix band.

5. The method of claim 4, further comprising the step(s) of aligning the ring tips with open spaces on opposing sides of and across the teeth.

6. The method of claim 5, further comprising the step(s) of after the matrix band has been expanded into the open diamond-shaped position, deforming the matrix band inward on itself until it is folded flat against two adjacent teeth;
   wherein the step of placing a dental matrix ring further comprises a step of placing the ring tips on an outside aspect of the folded matrix band portions that are collapsed against adjacent teeth; and a step of aligning the ring tips with one or two of the open spaces on opposing sides of the teeth.

7. The method of claim 4, further comprising the step(s) of pre-bending the matrix band into a diamond like shape before inserting between the teeth; and flattening the matrix band again into the closed position before insertion between the teeth.

8. A method for dental restoration comprising the steps of:
   providing a matrix band bent in half and forming two halves of the matrix band,
   the matrix bend attached to an end tail section of a wedge;
   pre-bending the matrix band into a diamond like shape before inserting between the teeth; and flattening the matrix band again before insertion between the teeth;
   inserting the matrix band perpendicular to the biting/occlusal surface of the tooth or teeth identified for repair by lowering the matrix band down between the teeth; and pushing the matrix band and the end tail section of the wedge between the teeth;

deforming the matrix band into the open diamond-shaped position with the two halves deformed away from each other; and placing a dental matrix ring over the matrix band with tips of the ring aligned inside or outside the matrix band.

9. The method, as in claim 5, further comprising a step of positioning the ring tips to compress a single layer of the first half or the second half of the matrix band against the tooth in need of repair.

10. The method, as in claim 5, wherein after the step of collapsing the diamond-shaped matrix band onto itself, the first half and the second half thereof form a dual-layer portion, wherein the method further comprising a step of positioning the ring tips to compress a single layer of the first half or the second half of the matrix band and a dual-layer of the first half or the second half of the matrix band against the tooth in need of repair.

* * * * *